United States Patent [19]
Green et al.

[11] Patent Number: 5,958,525
[45] Date of Patent: Sep. 28, 1999

[54] DEVICE AND KIT

[75] Inventors: Sarah E. Green, Wellesley; John A. Marciello, Burlington; Leonard Polizzotto, Stow, all of Mass.

[73] Assignee: Polaroid Corporation, Cambridge, Mass.

[21] Appl. No.: 08/996,808

[22] Filed: Dec. 23, 1997

[51] Int. Cl.$^6$ .................................................. G09B 11/00
[52] U.S. Cl. ............................ 428/14; 428/100; 428/13; 434/84
[58] Field of Search ............................... 428/14, 100, 13; 434/84, 98

[56] References Cited

U.S. PATENT DOCUMENTS

| | | | |
|---|---|---|---|
| 3,597,099 | 8/1971 | Tollin et al. | 401/7 |
| 4,057,921 | 11/1977 | Ball | 40/106.21 |
| 4,085,533 | 4/1978 | Ewald | 40/406 |
| 4,395,835 | 8/1983 | Schneider | 40/406 |
| 4,419,283 | 12/1983 | Schneider | 252/600 |
| 4,507,087 | 3/1985 | Stevenson | 434/98 |
| 4,631,210 | 12/1986 | McGee et al. | 428/13 |
| 4,631,847 | 12/1986 | Colin | 40/407 |
| 4,781,595 | 11/1988 | Cox | 434/81 |
| 4,875,953 | 10/1989 | Lloyd | 156/62 |
| 5,466,080 | 11/1995 | Lee | 401/7 |
| 5,676,549 | 10/1997 | Arad et al. | 434/84 |

*Primary Examiner*—Alexander Thomas
*Attorney, Agent, or Firm*—Jennifer A. Kispert

[57] ABSTRACT

There are described devices for creating artistic designs which are simple in approach and execution, and which enable the user to create a unique work of art without the user coming into direct contact with the medium used to create the design.

The subject devices comprise a first sheet and a second sheet, the sheets being in superposed relation, sealed around their periphery and defining a first area and a second area, a plurality of rupturable containers containing a spreadable medium, arranged in the first area and adapted to discharge the spreadable medium into the second area, provided that at least one of the sheets permits the viewing of the discharged spreadable medium.

A kit is also provided which includes the subject device and additional materials, such as, for example, decorative materials for application to the device and materials with which to attach the device to various surfaces.

21 Claims, 3 Drawing Sheets

DEVICE AND KIT

DEVICE AND KIT

This application is directed to a novel device for creating artistic designs and, more particularly, to a device which is simple in approach and execution, and which enables the user to create a unique work of art without the user coming into direct contact with the medium used to create the design. A kit is also provided which comprises the subject device and additional materials, such as, for example, decorative materials for application to the device and materials with which to attach the unique work of art to various surfaces.

BACKGROUND OF THE INVENTION

Devices for creating visual designs are known in the art, including devices which enable the user to avoid direct contact with the medium used to generate the design.

U.S. Pat. No. 3,597,099 discloses a device for finger painting which includes a substantially funnel-shaped cap member for fitting over the tip portion of a finger and a marking member which retains the paint or marking substance and to which the cap member is flexibly or fixedly secured.

U.S. Pat. No. 4,057,921 discloses a decorative device for displaying overlapping colors both in a static symmetrical configuration and in a kinetic, random and constantly changing pattern. The device consists of at least two sheet-like chambers in a face to face relationship. In each chamber there are at least two immiscible fluid phases of different specific gravities each of a different color.

U.S. Pat. No. 4,085,533 discloses a device for producing visual aesthetic effects which includes a vessel with a wall which transmits light and which contains at least two liquids of different density which are not completely and not permanently miscible with each other. The aesthetic effects result from the bringing together in the vessel at least three liquids as described in detail therein.

U.S. Pat. No. 4,395,835 discloses a display device comprising a transparent chamber containing three mutually immiscible liquids two of which are colored yellow, cyan or magenta with an external region colored yellow, cyan or magenta. Static, the device displays four or more colored regions or a "liquid rainbow." When deformed or inverted, the display device creates a multicolor kinetic display which, upon standing, separates back into the "liquid rainbow."

U.S. Pat. No. 4,419,283 discloses a display device which depends on the movement of a plurality of mutually immiscible liquids, and wherein the liquid movement may be induced by deformation of the flexible sheet-like walls by, e.g., finger pressure.

U.S. Pat. No. 4,507,087 discloses a closed finger painting device comprising a rigid base member to which a number of closed, clear, flexible, sealed bags are attached. Each bag contains a colorful, transparent fluid which can be manipulated within each bag by pressing the bag with one's fingers. When the fluids in more than one bag overlap, they create an optical impression of being mixed to create new colors.

U.S. Pat. No. 4,631,847 discloses "encapsulated art," i.e., a display device comprising a first layer sandwiched between a base and a nonporous transparent second layer through which the art is viewed. The first layer consists of a non-flowable, kneadable material of putty-like consistency which has at least two colors in adjoining areas. The kneadable material of the first layer is spread within the device by applying pressure to the material creating a plurality of different shaped colored portions.

U.S. Pat. No. 4,631,210 discloses a liquid-containing decorative device for securement upon articles of wearing apparel for purposes of ornamentation. The decorative device carries a predetermined amount of liquid of predetermined coloration which moves in response to the physical action of the wearer.

U.S. Pat. No. 4,781,595 discloses a composite sheet for forming visually observable designs which includes a transparent deformable upper layer having a plurality of pockets formed therein, a transparent intermediate layer sealed to the upper layer along edges of the pockets to form a plurality of containers, a lower layer connected to the intermediate layer and having a plurality of fluid activatable invisible designs formed thereon, and invisible design activation fluid contained within the containers to transform the invisible designs into visually observable designs upon breaking of the intermediate layer adjacent the containers by pressure exerted against the upper layer and subsequent contact of the fluid with the lower layer.

U.S. Pat. No. 4,875,953 discloses a process of transferring a printing medium from a printing medium coated member to a flexible receiving substrate by pressing selected areas of the substrate against the coated member whereby an impression print is created without the painter coming into direct contact with the printing medium.

U.S. Pat. No. 5,466,080 discloses a finger painting apparatus which includes a housing secured to the backhand portion of a user's hand by a flexible attachment strap. The housing supports a plurality of inverted paint bottles coupled to a corresponding plurality of flexible tubes at one end thereof. The remaining ends of the flexible tubes are coupled to a plurality of pad housings secured to the user's finger tips and supporting a plurality of porous paint pads on the undersurfaces thereof. The liquid paint material within the inverted paint bottles is caused to flow from the paint bottles through the tubes to the pad housings and thereafter to the porous pads to provide finger painting operation.

U.S. Pat. No. 5,676,549 discloses a children's toy finger painting system for dispensing a finger paint composition onto a substrate which includes a frame means having a base member and a cover member having a window opening therein, a substrate securing means for securing a paint receiving substrate to a substrate receiving area on the frame means, a paint dispensing means operatively associated with the frame means for dispensing liquid paint onto the paint receiving substrate and a transparent, flexible barrier means which is positioned within the window of the cover and in general structural alignment with the substrate receiving area and which permits the movement of paint across the substrate without direct physical contact with the paint.

The design and performance of such prior art devices and processes in some settings is not completely satisfactory. For example, some of the above-mentioned devices require the user to possess motor skills and artistic ability beyond that of some users, e.g., a small child, and, therefore, would not attract that particular user's attention, motivate the user to try it or, after having initially experimented with the device, to stick with it beyond the initial appeal of just something new and different.

It would be desirable to have a device which allows the user to express the user's creativity to create at any time a visible colorful unique work of art.

It would also be desirable to have a device for creating artistic designs which enables the user, especially in the case of a child, to play with the device without coming into direct contact with the medium used to create the design and which, at the same time, provides a device which is relatively inexpensive, simple in design and use, sturdy, educational, fun, safe, portable and which is not messy.

In addition, the inclusion of such an easily operable device in a kit which further includes materials, e.g., to decorate the device or to attach the device to desirable surfaces, such as, for example, a window, further facilitates the user's expression of the user's artistic creativity.

As the state of the art for devices for creating artistic designs which permit the user to create unique works of art without the user coming into direct contact with the medium used to create the designs continues to move forward, new techniques and materials continue to be developed by those of skill in the art in order to meet the performance criteria required of such devices and materials thereof, including the entertainment provided therefrom.

The present invention is drawn to novel devices for creating artistic designs which are simple in approach and execution, and which enable the user to create a unique work of art without the user coming into direct contact with medium used to create the designs.

SUMMARY OF THE INVENTION

There is provided according to the invention a device for creating artistic designs which comprises: a first sheet and a second sheet, the sheets being in superposed relation, sealed around their periphery and defining a first area and a second area, a plurality of rupturable containers containing a spreadable medium, arranged in the first area and adapted to discharge the spreadable medium into the second area, provided that at least one of the sheets permits the viewing of the discharged spreadable medium.

In operation, pressure is applied to the rupturable containers, such as, for example, by the user pressing or squeezing the containers between the user's fingertips, causing the containers to release the spreadable medium enclosed therein into the second area. The user then manipulates the released medium, e.g., by tracing a desired pattern with the tip of the user's finger or a suitable implement against the sheet which permits the viewing therethrough, to create a unique artistic design.

In a preferred embodiment the device further includes a mask. The subject mask provides advantages such as, for example, concealment of the rupturable containers and provision of a place for writing or for attaching decorative materials.

In another preferred embodiment the rupturable containers are "pods" as typically employed in the photographic art to retain and release upon pressure, e.g., from rollers through which the exposed instant film passes upon exiting the camera, a photographic processing composition with which the exposed film is developed.

In another preferred embodiment the device has a rectangular shape. In yet another preferred embodiment the play device has a square shape.

In a preferred embodiment of the kit of the present invention the kit contains a frame for the device, decorative material, such as, for example, stickers, with which to decorate the frame, implements to create design patterns by applying downward pressure of such implements on the sheet which permits the viewing therethrough of the discharged spreadable medium, and means, such as, for example, a hook and a suction cup, for attaching the device to a desired surface, e.g., a refrigerator or a window.

It has been found that devices utilized according to the present invention enable the user to easily create unique artistic designs without the user coming into direct contact with the medium used to create such designs.

It has also been found that the provision of a kit which includes the subject device and additional materials, such as, for example, decorative materials for application to the device and materials with which to attach the device to various surfaces, further facilitates the user's artistic expression.

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DETAILED DESCRIPTION OF THE PREFERRED EMBODIMENTS

Figure 1:
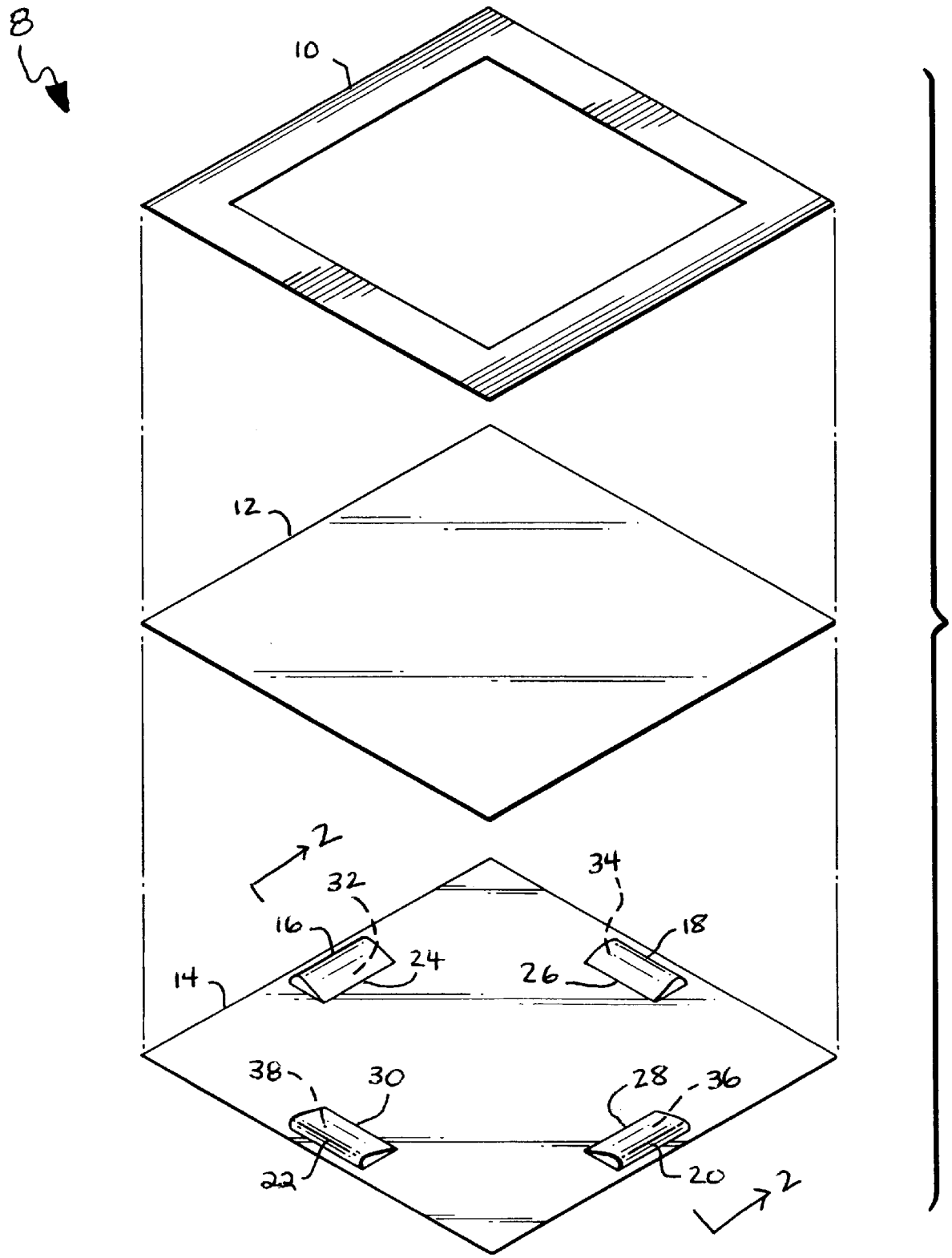
FIG. 1 is an exploded schematic view of an arrangement of essential elements of a preferred device of the present invention.

Referring now to FIG. 1, there is seen a preferred embodiment of a device 8 which comprises an opaque mask 10, a transparent first sheet 12, a transparent second sheet 14, the mask 10 and the first sheet 12 and the second sheet 14 in superposable relation, four opaque rupturable containers 16, 18, 20 and 22 attached to the second sheet 14, each of rupturable containers 16, 18, 20 and 22 having an edge 24, 26, 28 and 30, respectively, designed to rupture upon the application of pressure from one's fingers and releasably containing a spreadable medium 32, 34, 36 and 38, respectively, and the rupturable containers so positioned to distribute their spreadable media through the desired edge of the containers in between the sheets upon the rupturing of the containers.

The first and second sheets may each comprise any suitable material known in the art, provided that, the material be deformable but not readily breakable upon the application of finger pressure, not be porous to the extent that it would allow the spreadable medium to come into direct contact with the user's hands, fingertips, etc., and not be dissolved or decomposed by the spreadable medium, and further provided that, at least one of the sheets permits the viewing therethrough of the discharged spreadable medium. However, as would be appreciated by those of skill in the relevant art, for the sheet(s) which is transparent to the extent necessary to enable the viewing therethrough of the second area, optical clarity is desirable; hence, translucent materials are less preferred than materials of higher optical clarity.

In a preferred embodiment, such as, for example, the preferred device shown in FIG. 1 herein, both of the sheets are transparent.

In a particularly preferred embodiment one of the sheets is more pliable than the other sheet so that the less pliable sheet provides additional structural integrity, e.g., as a sort of backing layer, to the device during operation. Additional rigidity or stiffness of a sheet of the device can be attained by using poster board, heavier gauge colored polystyrene, heavier gauge films, unplasticized polyvinyl chloride, polyethylene terephthalate or acrylics.

In a particularly preferred embodiment the second sheet is less pliable than the first sheet. In another particularly preferred embodiment the second sheet is less pliable than the first sheet and is transparent.

In an especially preferred embodiment the device comprises a transparent first sheet comprising plasticized polyvinylchloride, a transparent second sheet comprising unplasticized polyvinylchloride, four opaque pod-like containers each including a spreadable medium different from the others, and a mask comprising a white water-resistant paper having hot melt adhesive coated on the backside thereof.

In a preferred embodiment the sheet(s) materials permit air to enter the device to enable the artistic design to dry.

In another preferred embodiment the sheet that the artistic design is viewed against may have a surface designed, e.g., dimpled or textured, to enhance the reception of and/or retention of the spreadable medium. In addition to, or, in place of, e.g., a dimple, the sheet that the artistic design is viewed against may include any other indicia such as, for example, a mark, a line, a character, a letter, a word, a phrase or a figure, e.g., a leaf or a flower, which is "artistically designed" or made visually discernable during the operation of the device. In embodiments wherein it is desirable to view such indicia the spreadable medium is preferably substantially transparent so that the designs, shapes, etc. may be viewed therethrough.

Suitable sheet materials include, for example, canvas, cloth, wood, fiber, paper, plexiglass, rubber, cardboard reinforced paper, e.g., poster board, metal foils, e.g., aluminum foil and lead foil, canvas, plastic, e.g., acetates, polyvinyls, e.g., polyvinyl chloride, polyvinyl acetate and polyvinyl butyral, cellulose acetate, e.g., cellophane or saran wrap, cellulose acetate butyrate, polymethyl methacrylate, polymethyl acrylate, polysulfone, polyarylsulfone, polyamide, polyvinylidene chloride, polyolefins, e.g., polyethylenes, polypropylene and polyesters, e.g., Mylar®, polymethylpentene, polystyrenes, polypropyl, polycarbonates, rayon, Teflon® or nylons, resins such as celluloid, polyvinylacetate-polyvinyl chloride copolymers, methacrylate polymers, phenol-formaldehyde condensation products and the like, and any other suitable elastomeric material, e.g., vinyl or acrylic plastic, and copolymers and combinations thereof; or other rigid or flexible material, or any suitable combination thereof.

In a preferred embodiment at least one of the first and second sheets comprises a thermoplastic resin selected from the group consisting of: polyvinyl chloride, polyvinyl acetate, polyvinylidene chloride, polyvinyl butyral, cellulose acetate butyrate, polymethyl methacrylate, polymethyl acrylate, polysulfone, and copolymers and combinations thereof.

In another preferred embodiment at least one of the first and second sheets comprises a thermoplastic resin selected from the group consisting of: polyvinyl chloride, polyvinyl acetate, polyvinylidene chloride, copolymers of vinyl chloride and other ethylenically unsaturated monomers, and combinations thereof.

In a particularly preferred embodiment at least one of the first and second sheets comprises copolymers of vinyl chloride and vinyl acetate.

In another preferred embodiment the first sheet comprises a thermoplastic material, such as, for example, polyethylene or polyvinylchloride.

In yet another preferred embodiment the second sheet comprises cardboard reinforced paper.

In another particularly preferred embodiment the first sheet comprises a thermoplastic material such as, for example, polyethylene or polyvinylchloride, and the second sheet comprises heavy gauge colored polystyrene.

As stated earlier, the spreadable medium should be selected such that it is substantially compatible with the sheet and container material. For example, it is known in the plastics art that acrylic plastics tend to be attacked by compounds which contain doubly bonded oxygen or triply bonded nitrogen atoms; hence, those of skill in the art should select a material for a particular component of the device, e.g., the sheets or the spreadable medium, of the present invention based upon factors, such as, for example, the interactions of the respective components with one another before finalizing any particular choice of suitable materials.

The sheets of the subject device may have any desirable finish, e.g., clear, matte, embossed, silk-like embossed, as long as the selected finish of at least one of the sheets is transparent to the extent necessary to enable the viewing therethrough of the discharged spreadable medium and subsequent artistic designs produced therefrom.

Each of the sheets used in the device of the present invention may be of any suitable thickness, the same or different, depending upon factors such as, for example, the age of the intended user or the intended ultimate use of the artistic design, e.g., adherence to a refrigerator or a car window. A preferred sheet thickness is from about 0.1 mil (0.0001 inch) to about 10 mil (0.01 inch). An especially preferred sheet thickness is from about 0.5 mil (0.0005 inch) to about 6 mil (0.006 inch). A particularly preferred sheet thickness is from about 0.5 mil (0.0005 inch) to about 2 mil (0.002 inch). Another particularly preferred sheet thickness is from about 0.8 mil (0.0008 inch) to about 1.2 mil (0.0012 inch). It is preferred that each of the sheets have a substantially uniform thickness.

The rupturable containers of the device may each comprise any suitable material known in the art, provided that, the material is not porous to the extent that it would allow the spreadable medium contained therein to come into direct contact with the user's hands, fingertips, etc., not be dissolved or decomposed by the spreadable medium, and be deformable enough to allow the rupturing of the rupturable surface upon the application of finger pressure to the container and the release of the spreadable medium therethrough between the first sheet and the second sheet, i.e., into the second area.

The rupturable containers of the device may include inner walls thus dividing the containers into separate compartments which may each contain a different spreadable medium. The containers may be designed such that the inner walls rupture first, i.e., before the edge of the container through which the spreadable medium is discharged into the second area, under pressure, e.g., from the user's finger tips, to mix the spreadable media of the various compartments before release thereof into the second area. Alternatively, use of a multi-compartmented container in the device of the present invention whereby each compartment discharges its contents individually allows for fewer containers overall along the perimeter of the sheets, i.e., in the first area. As would be understood by those of skill in the relevant art, the plurality of rupturable containers of the subject device may be provided as separate containers or as a single multi-compartmented container of suitable length and shape.

In a preferred embodiment the opaque rupturable containers are embossed prior to assembly of the device and, therefore, may serve as a suitable border or frame for the artistic design.

In addition, one of skill in the relevant art would understand that a suitable container for use in the subject device may be formed along the periphery of one of the sheets by folding the sheet back upon itself at its edges, and that, the edges of the sheet may be embossed prior to the container being so formed.

As stated earlier, the second area defined by the superposed, sealed first and second sheets into which the spreadable medium is discharged may be subdivided, e.g., by rupturable containers, to create a multiwindow or multipanel device, e.g., four paintings generated by one device.

Suitable rupturable container materials include, for example, any suitable materials described for the containers disclosed and claimed in U.S. Patent Nos. 2,653,732; 2,674,532; 2,702,146; 2,723,051; 2,750,075; 3,056,492; 3,173,580; 3,438,550; and 3,649,282; suitable materials for the sheets described-above, e.g., plastic; any suitable materials known to be used to construct "pods" or "pod-like structures," and any specific pods commonly employed in the instant photographic art, such as, for example, those pods disclosed in U.S. Pat. Nos. 2,634,886; 2,674,532; 3,056,491; 3,152,515; 3,833,381; 4,303,750; and 4,303,751.

It is preferred that the rupturable container comprise polyvinylchloride. Each of the containers may be transparent or opaque, or any variant thereof. In a particularly preferred embodiment the rupturable containers are opaque to render the spreadable medium contained therein a mystery to the user.

In embodiments wherein the rupturable containers are separate structures rather than formed from either of the sheet materials themselves as earlier described, it is particularly preferred that the containers be "pods" as is well known in the photographic art, and any suitable pod of any suitable shape and dimensions may be used as a rupturable container of the device of the present invention.

Generally, a pod used in photographic applications comprises a flat rectangular unit having straight edges and square corners and is sealed around its periphery to provide a cavity for the photographic processing fluid, but is adapted to release that fluid from one edge, upon the application to the container of a mechanical stress, usually provided by juxtaposed pressure-applying members in related photographic apparatus. For use as the rupturable container of the device of the present invention, the photographic processing fluid is replaced by the spreadable medium and the pressure-applying members are the user's, e.g., fingertips.

The rupturable containers of the device of the present invention are designed to store the spreadable medium with little degradation of either the spreadable medium itself or the rupturable container, and then, to rupture along one edge on demand, e.g., upon the application of pressure from the user's fingertips.

In a preferred embodiment the rupturable container is a pod which is from about 1 to about 1.50 inches wide by from about 2.75 inches to about 4.25 inches long.

In a particularly preferred embodiment the rupturable container is a pod which is about 1.25 inches wide by about 3 or 4 inches long and which contains about 3 mls of a spreadable medium.

In a particularly preferred embodiment of the present invention the device includes four pods. In another particularly preferred embodiment of the present invention the device includes six pods.

In a preferred embodiment the pod is a Mobil ATX 110 film on thin gauge aluminum, and the coated polyvinylchloride (CPVC) surface and oriented polypropylene (OPP) core provide suitable back and end seals, and suitable resistance to the spreadable medium.

In another embodiment the second sheet is wider than the first sheet, the spreadable medium is poured around the edges of the second sheet about an inch or so inward, and the container is provided by folding over the second sheet onto itself at its edges and hard-sealing the shorter edges and soft-sealing the folded-over edge facing inward to enable the rupturing thereof upon the application of pressure from the user's fingertips.

It will be understood by those of skill in the art that the form, capacity and dimensions of the rupturable containers of the subject device are predetermined relative to the first and second sheets, and, overall, to the intended use of the subject device and the intended result therefrom; hence, it will be apparent to those of skill that alternative forms and arrangements of the device and its components thereof, including its rupturable containers, may be provided within the scope of the present invention. Moreover, each of the rupturable containers comprising the subject device may be the same or different from the other containers.

As described-above for the sheets of the subject device, any desired shape may be constructed including, for example, square, rectangular, triangular, trapezoidal, disk-shaped, spherical, circular or oval, with any suitable sides, e.g., curved or flat.

In a preferred embodiment the device has a rectangular shape. In a particularly preferred embodiment the device is 8×10 inches. In a preferred embodiment the device is 8×10 inches and includes six pods.

In another preferred embodiment the device has a square shape. In a particularly preferred embodiment the device is 7×7 inches. In another preferred embodiment the device is 7×7 inches and includes four pods. In an especially preferred embodiment the device has a square shape and comprises transparent first and second sheets.

As would be appreciated by those of skill in the art, one advantage of a relatively simple design, such as that of the subject device, is that the dimensions and the shapes of the components of the device may be readily modified during manufacture thereof without significant increased spending to meet the user's interests as indicated by relevant market analyses.

Any suitable spreadable medium may be used in the devices of the present invention, and each of the rupturable containers may contain the same or a different suitable spreadable medium. It is preferred that each of the rupturable containers contain a different spreadable medium.

As stated earlier, the structural components of the device, principally, the first sheet, the second sheet and the containers, should be selected to be compatible with the desired spreadable medium to prevent the saturation, dissolution or destruction of the device by the spreadable medium which, in the case of dissolution or destruction would then, of course, defeat an advantage gained from the use of a device according to the present invention, i.e., the prevention of the user from coming into direct contact with the spreadable medium. Moreover, the materials comprising the subject device should not be substantially penetrable by or capable of releasing the spreadable medium via contact with sweat, e.g., on the user's fingertips, or saliva, e.g., from insertion into the juvenile user's mouth.

It would be appreciated by those of skill in the art that the spreadable medium should be selected so that the position of the discharged medium within the substantially parallel sheets undergoes pronounced change when the shape of the wall(s) of the sheet(s) is altered by finger pressure, squeezing, pinching, and the like.

It is also preferred that the spreadable medium be water-soluble, i.e., washable, fluid, i.e., a flowable substance of any viscosity, transparent, nonflammable, noncombustible, substantially noncorrosive to the selected materials comprising the device, and inexpensive. The spreadable medium may be water-soluble or non-water soluble, transparent or nontransparent, liquid or paste. In addition, the spreadable media within the different containers may have varying degrees of miscibility and viscosity with respect to one another and, therefore, would add a measure of challenge for the user. It is preferred that the spreadable medium be non-toxic. It is particularly preferred that the spreadable medium be edible.

Any suitable amount of the spreadable medium may be used in the devices of the invention, provided that, the medium be of sufficient volume to be readily substantially discharged from the container on demand, and be of sufficient volume to enable the user to spread the medium to create an artistic design. As would be understood by those of skill in the art, the amount of spreadable medium to employ in any given device can be readily determined by a number of factors such as, for example, the overall dimensions of the particular device, and the dimensions of its individual components, the number of containers comprising the particular device, and the nature of the selected spreadable medium, e.g., its chemical and physical characteristics, such as, for example, its viscosity.

In a preferred embodiment of the device each container is a pod. In a particularly preferred embodiment the rupturable container is a pod as described above which is about 1.25 inches wide by about 3 or 4 inches long and which contains about 3 mls of a spreadable medium.

For these and other reasons suitable spreadable media include a liquid substance, e.g., a liquid substance which maintains its liquidity throughout the range of normal room temperatures and pressures; a semi-liquid substance; a paste; food coloring; colored food additives; colorants for food and drugs; a plastic substance; dyes; water soluble dyes; liquids tinted with dyes; inks; paint, e.g., an acrylic paint; a grease-based paint; pigments, including luster and pearlescent pigments, e.g., titanium dioxide coated with mica platelets; color pigments; edible colored jellies; carbonated, colored beverages; glitter and oil and water color finger paints such as, for example, those commercially available from Sargent Art (Hazleton, Pa.); uncolored or colored vegetable juice, e.g. beet juice; dispersions of oils, e.g., edible oils such as vegetable oil, peanut oil, sunflower oil, olive oil, and medical grade mineral oil with an oil-soluble color or dye; oil soluble dyes; water-soluble color or dye such as cake coloring; and any suitable liquid compositions disclosed in U.S. Pat. Nos. 4,419,283 and 4,631,210. The subject spreadable medium may also comprise edible oil-based colors commercially available for coloring, e.g., candy, such as, for example, *Candy Colors* purchased from Wilton Enterprises, Inc. (Woodridge, Ill.).

The spreadable medium of the present invention may further contain any other suitable material which is substantially compatible with the medium, other components thereof and the elements of the subject device, provided that, the medium so constructed is substantially dischargeable from the container into the second area and spreadable within the second area.

The spreadable medium of the invention may contain some additional material, such as, for example, a souring, peppery or bittering agent, to deter the ingestion of the spreadable medium should the device be subjected to a destructive force resulting in the release of the spreadable medium from the containers other than into the second area or from the second area itself after a suitable discharge has occurred. The subject medium may also contain any compatible preservative, bactericide, fungicide and the like, to prevent spoilage of the medium during the expected shelf life of the device and during the foreseeable period of retention of the artistic design.

In addition, the subject medium may also contain a material which provides a desirable scent to the device during and after operation, e.g., rose oil, eucalyptus oil, or where an orange-colored medium is discharged from a container the scent of oranges is detectable by the user, where a yellow-colored medium is discharged the scent of lemons is detectable by the user, where a purple-colored medium is discharged the scent of grapes is detectable by the user, or where a green-colored medium is discharged the scent of mint is detectable by the user.

It would be understood by those of skill in the art that, in some situations, such as, for example, where the user of the subject device is a young child, and where the spreadable medium contains a pleasantly scented material, that the spreadable medium be edible.

In a preferred embodiment the spreadable medium comprises food coloring and corn syrup.

In another preferred embodiment the medium comprises a sheer thinning colored material made of a thickener, coloring material, particulate matter such as, for example, plastic glitter, and pigments.

In another preferred embodiment the medium includes magnetic materials such that, for example, the final artistic design may be readily and detachably adhered to, e.g., a refrigerator, for display.

In yet another preferred embodiment the medium comprises a luminescent dye. The luminescent dye is responsive to invisible radiation emitted from a black light. The source of the black light comprises an ultraviolet lamp.

As stated earlier, the superposed first and second sheets are sealed to around their periphery to create a liquid-tight seal, and define a first area and a second area, and the rupturable containers are attached to the first area. Any suitable means of bonding the sheets to each other or the container to the sheet(s) may be used in the devices of the present invention, such as, for example, bonding using lamination, heat, pressure, cementing, e.g., using contact cement, or crimping.

Virtually any attachment mechanism may be employed in the devices of the present invention. Factors to be considered when selecting a means of attachment include, for example, the materials comprising the sheets and the containers, and the relative ease of separation by the juvenile user. For example, it is known in the art that polyethylene is generally heat-bondable but nylon is not; hence, a means of attachment which utilizes heat, e.g., a heat seal, may be suitable for use with sheets or containers comprising polyethylene but not for sheets or containers comprising nylon. It would be understood by those of skill in the art in conjunction with the teachings provided herein which attachment materials and modes would be preferred for specific sheet and container materials.

Suitable means for attaching, securing or sealing the components of the device to one another include, for example, heat, e.g., selectively heated platen, pressure, heat and pressure, adhesive materials, e.g., glue, anaerobic glue, adhesive strips, adhesive tape and hot melt glues, solvent bonding, e.g., a layer of methylene chloride for, e.g., cast acrylic, welding, e.g., sonically, ultrasonic sealer, leak-proof sealant layers, e.g., a plastisol or polyvinyl chloride in methyl ethyl ketone, or a gasket constructed of, e.g., foam cell plastic, rubber or other suitable materials which are resilient, compressible and capable of forming a substantially leak-proof seal for the spreadable medium. In addition, the respective structural components of the device may be so designed as to be compression fitted or mateably-receivable to one another.

In a preferred embodiment the first and second sheets are sealed about the periphery, as described-above, by using a hot melt adhesive.

In another preferred embodiment the containers are heat sealed to the second sheet, as described-above, by using a hot melt adhesive, provided that, the container so positioned and attached may discharge its contents into the second area.

As stated earlier, in a preferred embodiment, such as that depicted in FIG. 1 herein, the device includes a mask 10. As described above for the sheets and the rupturable containers of the subject device, the mask may have any suitable dimensions. Any suitable material may be used as the subject mask including any suitable materials selected from those described-above for the sheets and container.

The subject mask may have any suitable thickness based upon, e.g., the overall desired thickness of the subject device or the intended use of the artistic design produced by operation of the subject device.

In a preferred embodiment the mask provides a white border which masks the rupturable containers and provides a suitable surface upon which the user may write and which the user may decorate with stickers.

The subject mask may be attached to the sheets in any suitable way including as described-above for the attachment or sealing of the sheets to one another, and to the container. In a preferred embodiment the mask is attached or bonded to the second sheet. In a particularly preferred embodiment the second sheet is less pliable than the first sheet and the mask is bound to the second sheet.

In a preferred embodiment the mask is a paper. In another preferred embodiment the mask is a white paper. In another preferred embodiment the mask is a colored paper. In yet another embodiment the mask is an embossed paper. In an especially preferred embodiment the mask is a water-resistant paper. In a particularly preferred embodiment the mask is a 30 to 70 pound water-resistant paper.

In another preferred embodiment the backside of the mask, i.e., the side to be attached or adhered to the sheet(s) of the device, has an adhesive coated thereon. In a particularly preferred embodiment the backside of the mask has a hot melt adhesive coated thereon.

In an especially preferred embodiment the mask comprises an outer polyethylene terephthalate film which includes inorganic fillers, e.g., talc, an inner white to light gray OPP film which has an adhesive layer coated on the backside thereof for attachment or adherence to the sheet(s) of the device.

In a particularly preferred embodiment the device has an 8×10 inch shape, and comprises a transparent first sheet, an opaque second sheet which is less pliable than the first sheet, six opaque containers each of which contains a different colored, non-toxic, water-soluble, spreadable medium, and a mask of water-resistant, white paper which is adhesively bound to the second sheet.

In another particularly preferred embodiment the device has a 7×7 inch shape, and comprises a transparent first sheet, a transparent second sheet which is less pliable than the first sheet, four opaque containers each of which contains a different colored, non-toxic, water-soluble, spreadable medium, and a mask of water-resistant, white paper which is adhesively bound to the second sheet.

The present invention also provides a kit whose components are preferably enclosed in a suitable container, such as, for example, a container similar to a lunchbox, tacklebox, toolbox or a box that generally is of the type that artists use to hold their paints, glues, brushes, etc.

While a typical kit may contain more or less components, it will comprise a device according to the invention, and typically contain one or more decorative materials, e.g., stickers of, for example, animals, geometric shapes like stars, other art forms, glue and glitter, an implement for use with the device as described in detail below, means for securing, preferably, detachably, the device to any desirable surface, e.g., a refrigerator or a window, and a booklet of instructions or directions for, e.g., how to operate the device or how to assemble the components to attach the artistic design to any particular surface. The kit typically also contains a writing instrument such as, for example, a crayon or a marker, to decorate or write on the device. The kit generally also includes a suitable frame within which to place the device.

Any suitable means for attaching, detachably or non-detachably, or hanging, the device to a desired surface may be used in the present invention, including, for example, a snap-fit attachment; a flexible strap and fabric attachment pad; attachment pads formed of, e.g., cooperating hook and loop fabric attachment elements; velcro®; tab and groove means; clips; slots and grooves; adhesive strips; a hinge or hinge assembly; dowels and apertures; grooves and beads; compressive fitment; suction cup with hook; latching device; buttons; clips; clamps; adhesive on the outer surface of the sheet deemed to be the backing sheet; or other similar means for temporarily or permanently securing the device to the desired surface. In a preferred embodiment the kit includes a suction cup with hook for detachably attaching the device to the desired surface. In a preferred embodiment of the present invention as shown, for example, in FIG. 4 herein, the device comprises a mask which includes a loop on its backside through which a hook, specifically, a hook attached to a suction cup, as depicted, may be placed to facilitate the "hanging" of the artistic design.

As stated earlier, in a preferred embodiment of the kit of the present invention an implement(s), such as, for example, a wooden stick, a roller, a trowel, a spatula, a rake-like device or a stamp-type impression, is provided to create design patterns by applying downward pressure of the implement on the sheet which permits the viewing of the discharged spreadable medium after the medium has been discharged from the containers. Preferably, the implement(s) comprises a rigid or semi-rigid plastic material and does not have pointed, sharp or rough edges that could easily pierce or puncture the sheet on which it is used. In a preferred embodiment the implement is a thin, flat wooden stick.

In another preferred embodiment the implement is a roller-type device with a design embosser having raised designs carried on the surface of the roller and capable, with downward pressure, of imparting a surface impression on the discharged medium confined within the sheets or within the second area.

Figure 2:
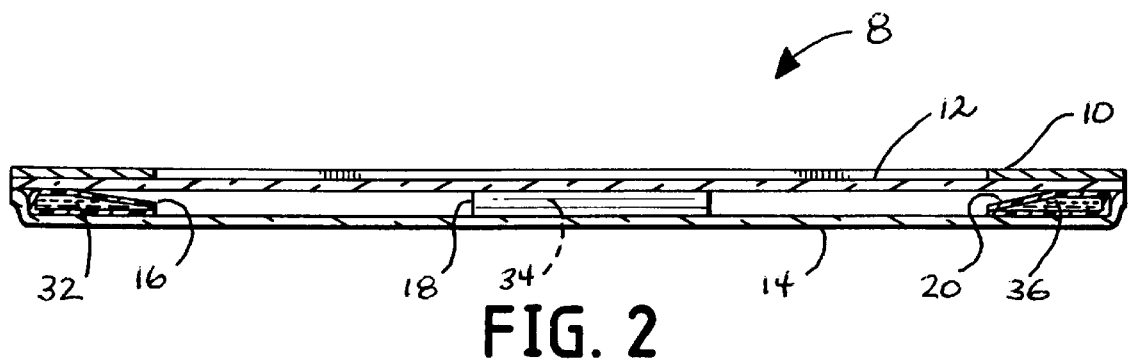
FIG. 2 is an enlarged schematic cross-sectional view of the preferred device of the present invention which is depicted in FIG. 1.

Referring now to FIG. 2 which depicts an enlarged schematic cross-sectional view of the preferred device of FIG. 1 and which specifically shows the preferred device 8, the mask 10, the transparent first sheet 12, three of the four opaque pod-like containers, specifically, 16, 18 and 20, the medium of containers 16, 18 and 20, namely, 32, 34 and 36, respectively, and the transparent second sheet 14.

Figure 3:
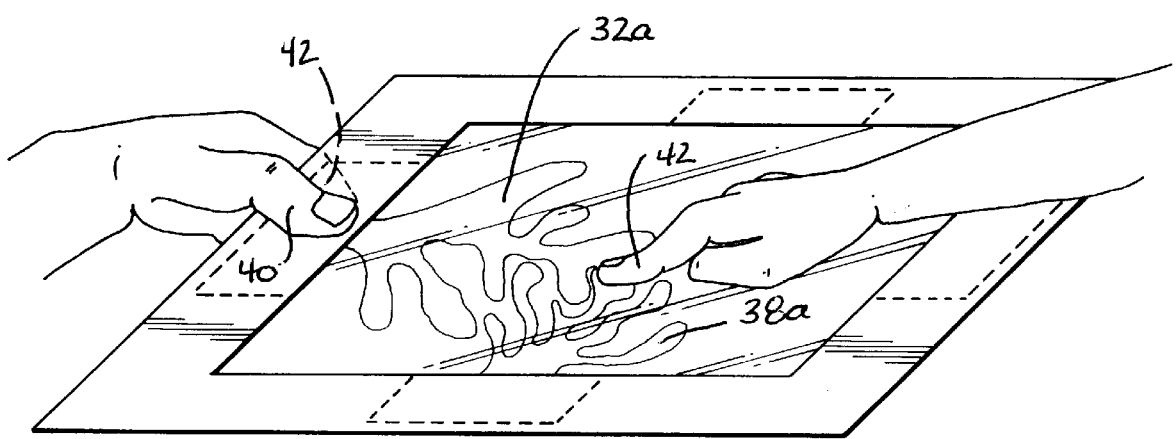
FIG. 3 is an enlarged schematic top plan view of the preferred device of the present invention which is depicted in FIG. 1, in operation, during which the spreadable medium is discharged from the rupturable container by pressure applied to the rupturable container from the user's fingertips, and the unique artistic design is created by the user's manipulation of the discharged spreadable media by pressure from the user's fingertips against the sheet which permits the viewing therethrough.

Referring now to FIG. 3 which depicts an enlarged schematic top plan view of the preferred device of FIG. 1, in operation, pressure is applied to each of containers, e.g., by the user squeezing the containers between the user's thumb 40 and fingertip 42, causing the container to release the spreadable medium 32*a* enclosed therein between the first and second sheets, into the second area, container 20 having already released its medium 38*a* as shown. The user then manipulates the released media, 32*a* and 38*a*, by pressing the user's fingertip 42 against the sheet which permits the viewing of the discharged spreadable medium, to create a unique work of art without the user's fingers coming into direct contact with the medium.

Figure 4:
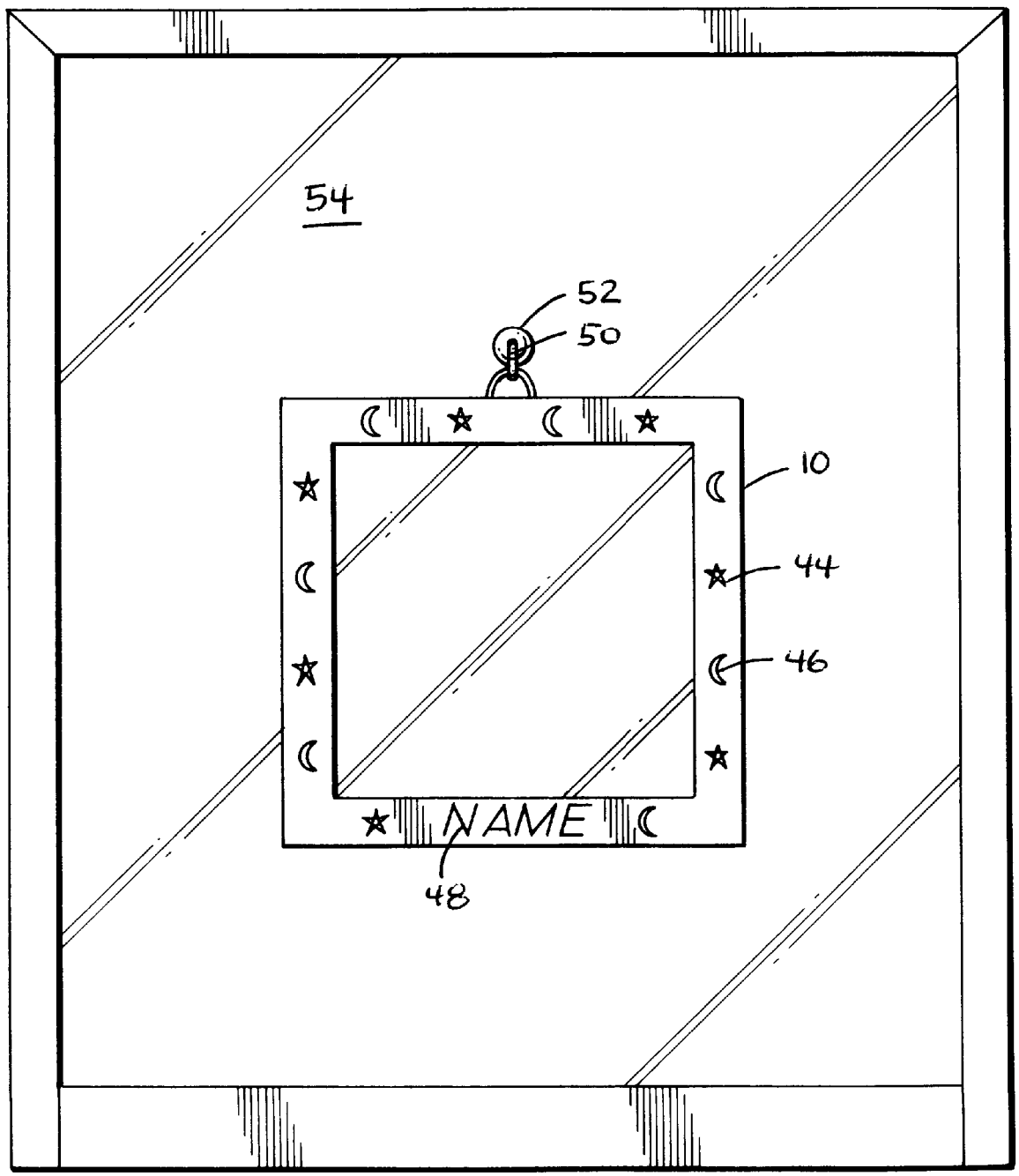
FIG. 4 is an enlarged schematic top plan view, post-operation, of the preferred device of the present invention depicted in FIG. 3, which has been further decorated on its mask with adhesive stickers of geometric shapes and letters of the alphabet and which has a loop on its backside through which a hook attached to a suction cup is secured, the suction cup being attached to a window, as further described herein.

Referring now to FIG. 4 which depicts an enlarged top plan view of the device of FIG. 3, post-operation, the mask 10 is decorated with geometric figures having an adhesive strip on the backside, specifically, with stars 44 and one-quarter moons 46, and the user's name using letters 48 having an adhesive strip on the backside, and is attached by the supplied hook 50 and suction cup 52 to the desired surface 54, specifically, a window, according to the present invention.

As mentioned earlier, it should be noted that the components of the device and the kits according to the present invention may be comprised of any suitable materials which are well known in the art for use in constructing such components. Such other materials include, for example, plasticizers, antistatic agents, coating aids such as surfactants, and the like.

While preferred embodiments of the devices of the present invention may be enjoyed by users of all ages to reduce stress or as toys, the subject devices have many varied, suitable uses and, hence, are not so limited.

The invention will now be described further in detail with respect to specific preferred embodiments by way of examples, it being understood that these are intended to be illustrative only and the invention is not limited to the materials, procedures, amounts, etc. recited therein. All parts and percentages recited are by weight unless otherwise stated.

EXAMPLE I

Four devices were prepared according to the invention. More specifically, each of the four 8×10 inch devices comprised: a transparent first sheet; an opaque second sheet which was less pliable than the first sheet; six pod-like containers (a) about 1.25 inches wide by about 3.5 inches long, (b) positioned about 1.25 inches in from the respective edges of the second sheet, (c) attached to the second sheet by a hot melt adhesive and (d) which contained about 3 mls each of varied spreadable media which were supplied to their respective containers before the containers were sealed to the second sheet, and, using a method substantially similar to the method with which a photographic processing composition is supplied to a pod in the photographic art before the pod is incorporated within an image-recording material; a mask comprising a white paper with about 10 pounds of polyethylene per about 3000 square foot ream and about 8 pounds of hot melt adhesive; wherein the mask is adhesively bonded to the first sheet which is adhesively sealed to the second sheet, as described in more detail in TABLE I.

TABLE I

| Device | First Sheet | Second Sheet | Spreadable Medium |
|---|---|---|---|
| 1 | PVC | white paper | fingerpaint |
| 2 | OPP | colored paper | food coloring and thickener |
| 3 | PE | PET | vegetable oil and pigment |
| 4 | PS | posterboard | latex paint | wherein: PVC is polyvinyl chloride; OPP is oriented polypropylene; PE is polyethylene; PS is polystyrene; PET is polyethylene terephthalate; posterboard is about 60–150 lb. board with water-resistant extrudable PE.

Each of the devices so constructed held together and did not show any leakage of the spreadable medium therefrom prior to operation.

A unique artistic design was created from each device by the tester squeezing each of the rupturable containers between his fingertips to substantially discharge the spreadable medium therein between the first and second sheets, and then, manipulating the spreadable medium within the sheets by the tester pressing his fingertips against the first sheet.

In each case the tester was able to discharge the spreadable medium from the rupturable containers without any compromise of the structural integrity of the device, and without any of the spreadable media leaking from the device.

In addition, in each case, the tester was able to manually manipulate the discharged spreadable medium, e.g., by twisting, bending and pressing his fingers against the components of the device, without the spreadable medium leaking or otherwise escaping from the device.

Based upon the lack of leakage of the spreadable medium from the device before, during or after operation thereof, the tester was able to use the subject devices to create unique works of art without coming into direct contact with the media used to create the artistic designs.

EXAMPLE II

A kit was prepared according to the invention. More specifically, the kit contained a 7×7 inch device of the invention which comprised: a transparent first sheet comprising plasticized polyvinylchloride; a transparent second sheet comprising unplasticized polystyrene which was less pliable than the first sheet; four opaque pod-like containers (a) about 1.25 inches wide by about 3.5 inches long, (b) positioned about 1.25 inches in from the respective edges of the second sheet (c) attached to the second sheet by a hot melt adhesive and (d) each containing a different spreadable medium (about 3 ml each) supplied to the container as described in Example I; a mask as described in Example I; and further including on one side of the mask about a one half inch long thin piece of shoestring-like plastic attached at both of its ends to the mask to form a loop; a hook and suction cup for attaching the device to a, e.g., car window, by placing the loop over the hook and the suction cup against the, e.g., window; an implement, specifically, a thin, wooden stick, to assist with the creation of the artistic design; and decorative stickers, specifically, sun-like geometric shapes having smiling faces, and letters of the alphabet each having an adhesive material on their backsides for attaching to the mask.

A unique artistic design was created from the device by a 6 year old child squeezing each of the containers between his fingertips to discharge the spreadable medium therefrom between the first and second sheets, and then, manipulating the spreadable medium within the sheets by pressing his fingertips against the first sheet.

The child was able to fairly quickly get the idea with respect to squeezing the containers between his thumb and forefinger to release the spreadable medium from each of the containers. He expressed joy and amazement at being surprised as to which colored fluids were released from each of the containers. He enjoyed manipulating the discharged spreadable medium by twisting and bending the device, and by pressing his fingers against the first sheet and tracing a desired shape.

Moreover, the child's mother was quite happy that her son not only enjoyed creating his own artwork and presenting her with it but, did so, without getting any of the spreadable medium on his hands or leaving her with a sizeable cleanup job.

After the child had completed his artistic design, he decorated the mask with the stickers and with letters spelling his name centered below the second area. The child's mother then placed the hook through the loop on the back of the mask and attached the suction cup to a window of her automobile, such that, the sunlight shown through the device.

EXAMPLE III

A kit was assembled according to the invention. More specifically, the kit included: a device prepared as described for device 2 in Example I, except that, (a) the mask was embossed with a clown-like geometric pattern prior to its assembly with the other components of the device and (b) the spreadable medium further included magnetic particles to enable the device to be easily detachably-adhered to a suitable metal surface, e.g., the refrigerator of the user's home, the user's metal desk at school or the automobile the user rides in; a thin, flat wooden stick to manipulate the discharged spreadable medium; and crayons for coloring the clown as so desired.

After the 8 year old manipulated the device as described in Examples I and II to discharge the spreadable medium from the rupturable containers, she used the wooden stick against the first sheet to manipulate the discharged medium, colored in the embossed clown, and then, by virtue of the now-dispersed magnetic particles, attached her unique work of art to the refrigerator for all to see.

As will be appreciated by those of skill in the relevant art from the observations reported in Examples I, II and III, a device prepared according to the present invention withstands the manual manipulations of a young users.

In addition, the devices of the invention enable the user to play with the device and create an artistic design without coming into direct contact with the medium used to create the design.

The present invention provides a device which is simple in design and use. The subject device permits the user of any age to express his or her creativity or reduce his or her daily stress by squeezing the rupturable containers thereof to discharge the spreadable medium into the second area, and then, by any suitable means, e.g., fingertip, hand, foot, or an implement such as, for example, a thin, wooden stick, manipulating the discharged medium within the sheets to create a unique work of art capable of being displayed as is or, as attached to any desired surface.

Although the invention has been described in detail with respect to various preferred embodiments thereof, those skilled in the art will recognize that the invention is not limited thereto but rather that variations and modifications can be made which are within the spirit of the invention and the scope of the appended claims.

What is claimed is:

1. A device for creating an artistic design which comprises:
    a first sheet and a second sheet; said sheets being in superposed relation, sealed around the periphery and defining a first area and a second area;
    a plurality of rupturable containers arranged on said first area, containing a spreadable medium and so positioned on said first area to be adapted to discharge said spreadable medium into said second area;
    provided that, at least one of said sheets permits the viewing of said discharged spreadable medium.
2. A device as defined in claim 1 further including a mask.
3. A device as defined in claim 2 wherein said mask comprises a white paper.
4. A device as defined in claim 1 having a rectangular shape.
5. A device as defined in claim 4 wherein said rupturable containers are from about 1 to about 1.50 inches wide by from about 2.75 inches to about 4.25 inches long.
6. A device as defined in claim 4 wherein the dimensions of said rectangular shape are about 8 inches by about 10 inches.
7. A device as defined in claim 6 comprising six of said rupturable containers.
8. A kit as defined in claim 7 wherein said attachment means is a hook attached to a suction cup.
9. A device as defined in claim 1 having a square shape.
10. A device as defined in claim 9 wherein the dimensions of said square shape are about 7 inches by about 7 inches.
11. A device as defined in claim 10 comprising four of said rupturable containers.
12. A device as defined in claim 1 wherein said first sheet is transparent.
13. A device as defined in claim 12 wherein said second sheet is transparent.
14. A device as defined in claim 1 wherein said spreadable medium further includes glitter.
15. A device as defined in claim 1 wherein said spreadable medium is fingerpaint.

16. A device as defined in claim 15 wherein said spreadable medium further includes glitter.

17. A device as defined in claim 1 wherein the thickness of said sheets is from about 0.1 mil to about 10 mil.

18. A device as defined in claim 1 wherein said first sheet comprises polyvinylchloride.

19. A device as defined in claim 1 wherein said second sheet comprises white paper.

20. A device as defined in claim 1 wherein said sheets are transparent, said second sheet is less pliable than said first sheet.

21. A kit comprising:
  a device for creating an artistic design as defined in claim 1;
  a set of directions for operation of said device;
  a frame for said device;
  an implement;
  a decorative material; and
  an attachment means for attaching said device to a surface.

* * * * *